United States Patent
Oh et al.

(10) Patent No.: US 9,317,132 B2
(45) Date of Patent: Apr. 19, 2016

(54) METHOD AND APPARATUS USING ON-SCREEN KEYBOARD AS INPUT UNIT

(75) Inventors: Jung-Hwan Oh, Suwon-si (KR); Go-Un Lee, Seoul (KR); Sang-Chun Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1869 days.

(21) Appl. No.: 11/969,251

(22) Filed: Jan. 4, 2008

(65) Prior Publication Data

US 2009/0044135 A1 Feb. 12, 2009

(30) Foreign Application Priority Data

Aug. 7, 2007 (KR) .................. 10-2007-0079060

(51) Int. Cl.
G06F 3/048 (2013.01)
G06F 3/023 (2006.01)
G06F 3/0488 (2013.01)

(52) U.S. Cl.
CPC .......... *G06F 3/0236* (2013.01); *G06F 3/04886* (2013.01)

(58) Field of Classification Search
CPC .................. G06F 3/0236; G06F 3/04886
USPC ......... 715/765, 766, 767, 827, 831, 851, 855; 345/168, 169; 341/22; 708/142, 144, 708/146

See application file for complete search history.

(56) References Cited

U.S. PATENT DOCUMENTS

| | | | |
|---|---|---|---|
| 5,661,476 A | | 8/1997 | Wang et al. |
| 5,990,890 A | * | 11/1999 | Etheredge ............... 715/808 |
| 2002/0180708 A1 | * | 12/2002 | Kaelbling ............... 345/169 |
| 2003/0112224 A1 | * | 6/2003 | Pan et al. ............... 345/171 |
| 2003/0122785 A1 | * | 7/2003 | Jayachandra ............ 345/171 |
| 2004/0139254 A1 | * | 7/2004 | Tu et al. ............... 710/73 |
| 2005/0017955 A1 | * | 1/2005 | Jayachandra ............ 345/171 |
| 2005/0057512 A1 | * | 3/2005 | Du et al. ............... 345/168 |
| 2005/0122313 A1 | * | 6/2005 | Ashby ............... 345/168 |
| 2006/0228149 A1 | * | 10/2006 | Harley ............... 400/486 |
| 2006/0294273 A1 | * | 12/2006 | Lee ............... 710/67 |
| 2007/0245259 A1 | * | 10/2007 | Carlson ............... 715/773 |
| 2008/0055117 A1 | * | 3/2008 | Lee ............... 341/23 |
| 2008/0122658 A1 | * | 5/2008 | Salman et al. ............ 341/22 |
| 2008/0303793 A1 | * | 12/2008 | Carroll ............... 345/168 |
| 2009/0319943 A1 | * | 12/2009 | Ha ............... 345/168 |

FOREIGN PATENT DOCUMENTS

| | | |
|---|---|---|
| EP | 1333365 | 8/2003 |
| EP | 1422598 | 5/2004 |
| JP | 10-228344 | 8/1998 |

(Continued)

OTHER PUBLICATIONS

Office Action issued in corresponding European Patent Application No. 08162004.9 dated Dec. 4, 2008.

*Primary Examiner* — Anil Bhargava
(74) *Attorney, Agent, or Firm* — Jefferson IP Law, LLP

(57) ABSTRACT

A method and apparatus using an on-screen keyboard as an input unit. A method of using an on-screen keyboard as an input unit comprises receiving information on a first key that is selected through the input unit that has fewer input keys than the on-screen keyboard, highlighting a predetermined key in a predetermined group of keys including a number key on the on-screen keyboard that corresponds to the first key, and moving a highlighted portion on the on-screen keyboard when a second key is selected through the input unit.

25 Claims, 4 Drawing Sheets

(56) References Cited

FOREIGN PATENT DOCUMENTS

| | | |
|---|---|---|
| JP | 10-240418 | 9/1998 |
| JP | 2001-166868 | 6/2001 |
| JP | 2005-316961 | 11/2005 |
| KR | 10-2003-0064656 A | 8/2003 |
| KR | 10-2004-0006035 A | 1/2004 |
| KR | 2004-66978 | 7/2004 |
| KR | 10-2005-0001848 A | 1/2005 |

* cited by examiner

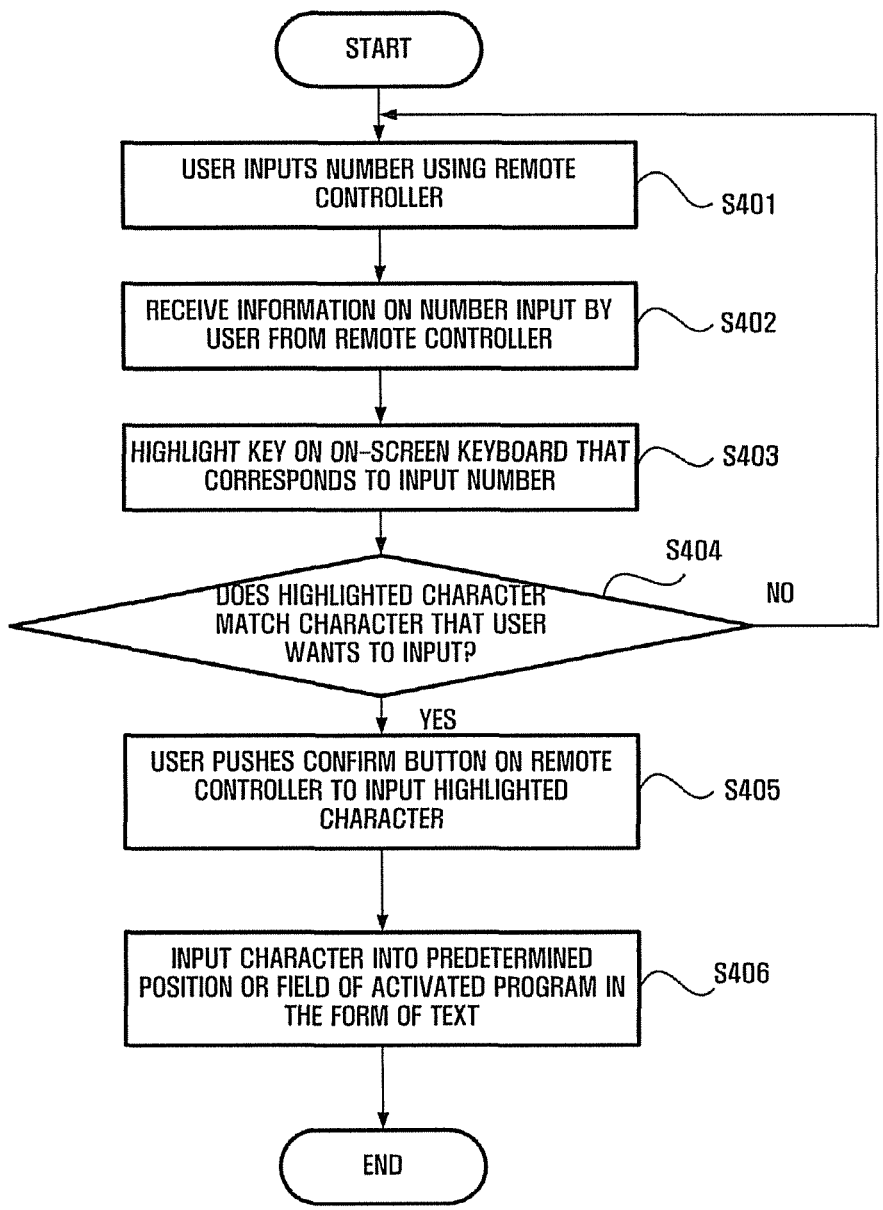

METHOD AND APPARATUS USING ON-SCREEN KEYBOARD AS INPUT UNIT

CROSS-REFERENCE TO RELATED APPLICATIONS

This application claims priority from Korean Patent Application No. 2007-79060 filed in the Korean Intellectual Property Office on Aug. 7, 2007, the disclosure of which is incorporated herein by reference in its entirety.

BACKGROUND OF THE INVENTION

1. Field of the Invention

Aspects of the present invention relate to a method and apparatus for using an on-screen keyboard as an input unit and, more particularly, to a method and apparatus for using a remote controller and an on-screen keyboard to conveniently and rapidly input characters.

2. Description of the Related Art

Microsoft Windows is the operating system (OS) used by most computers. Windows provides an on-screen keyboard (hereinafter, referred to as an OSK) function. The OSK is a keyboard that is displayed on the screen of the computer. The user can select keys on the OSK to directly input characters to a predetermined position or a field of an activated program in the form of text.

When there is no keyboard, or when the keyboard is unavailable, the OSK can be used as a temporary expedient. When a small number of characters are input, such as a password or a file name, the use of the OSK makes it possible to prevent hacking via the keyboard. In recent years, a computer environment that can remotely control an operating system of the computer and various applications executed by the operating system, such as Microsoft Windows Media Center, has been established, which makes it possible to use a remote controller to input characters through the OSK.

In using the remote controller to input characters in the computer environment, the user pushes a direction button on the remote controller to move a highlighted portion to a character that the user wants to input on the OSK. When the highlighted portion is moved to the character, the user pushes a selection (or confirm) button on the remote controller to input the character.

FIG. 1 shows an OSK that is provided by Windows. The user must push the direction button on the remote controller ten times or more to move a highlighted portion 101 from the leftmost side to the rightmost side. A lot of time and a large amount of effort is required to select characters located at opposite sides of the OSK. When the user wants to input a large number of characters, the difficulty increases.

SUMMARY OF THE INVENTION

Aspects of the present invention provide a method and apparatus using an OSK as an input unit that is capable of rapidly and conveniently inputting characters using a remote controller and an OSK, thereby shortening time to input characters.

According to an aspect of the present invention, a method of using an on-screen keyboard is provided. The method comprises receiving information on a first key that is selected through an input unit that has fewer input keys than the on-screen keyboard; highlighting a predetermined key, which corresponds to the first key, in a predetermined group of keys including a number key on the on-screen keyboard; and moving a highlighted portion on the on-screen keyboard when a second key is selected through the input unit.

According to another aspect of the present invention, an apparatus using an on-screen keyboard is provided. The apparatus comprises a receiving unit to receive information on a first key that is selected through an input unit having a smaller number of input keys than the number of keys of the on-screen keyboard; a highlight-setting unit to highlight a predetermined key, which corresponds to the first key, in a predetermined group of keys including a number key on the on-screen keyboard; and a moving unit to move a highlighted portion on the on-screen keyboard when a second key is selected through the input unit.

However, the aspects, features, and advantages of the present invention are not restricted to the ones set forth herein. The above and/or other aspects, features and advantages of the present invention will become more apparent to one of ordinary skill in the art to which the present invention pertains by referencing a detailed description of the present invention given below.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a flowchart illustrating a process of using the OSK as the input unit according to an embodiment of the present invention.

DETAILED DESCRIPTION OF THE EMBODIMENTS

Figure 1:
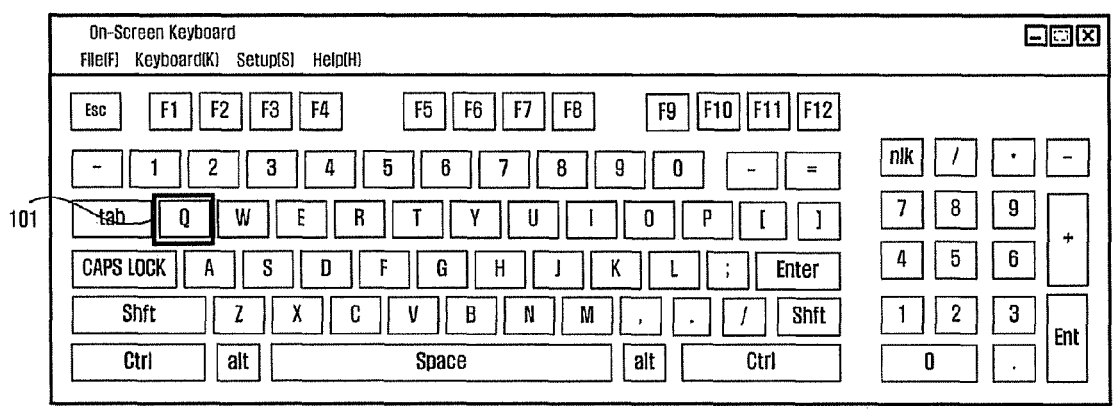
FIG. 1 is a diagram illustrating an OSK provided by Windows.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention is described hereinafter with reference to flowchart illustrations of user interfaces, methods, and computer program products according to aspects of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create a device to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

A unit described in an embodiment of the present invention, as used herein, refers to, but is not limited to, a software or hardware component, such as a Field Programmable Gate Array(FPGA) or Application Specific Integrated Circuit(ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the units and components may be combined into fewer components and modules or further separated into additional components and modules.

Figure 2:
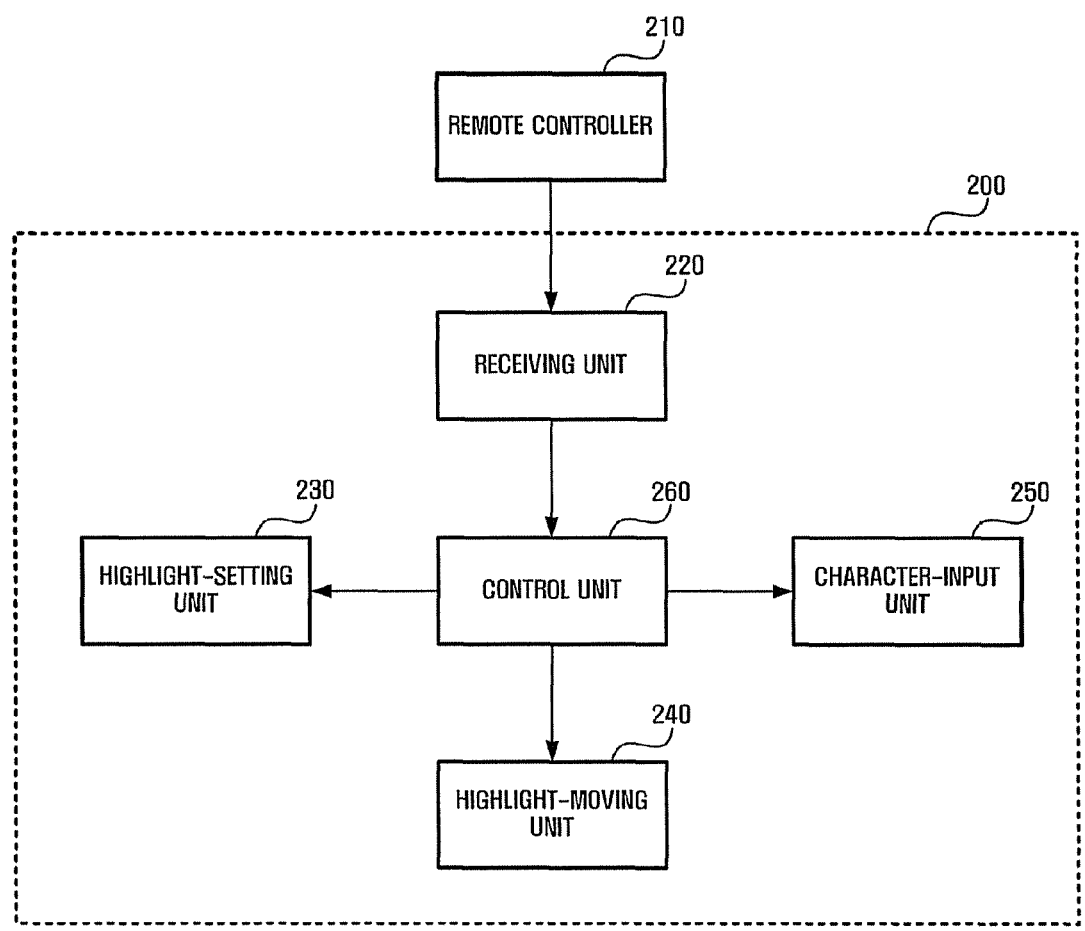
FIG. 2 is a diagram illustrating the structure of an apparatus using an OSK as an input unit according to an embodiment of the present invention.

FIG. 2 shows the structure of an apparatus 200 using an OSK as an input unit according to an embodiment of the present invention. The apparatus 200 includes a receiving unit 220, a highlight-setting unit 230, a highlight-moving unit 240, a character-input until 250, and a control unit 260. According to other aspects of the invention, the apparatus 200 may include additional and/or different units. Similarly, the functionality of two or more of the above units may be integrated into a single component.

The receiving unit 230 receives first key information selected by an input unit having a smaller number of input keys than that of the OSK. The highlight-setting unit 230 highlights a predetermined key in a group of keys, including number keys of the OSK corresponding to the first key information. The highlight-moving unit 240 moves a highlighted portion on the OSK in response to second key information received from the input unit. A character-input unit 250 selects a highlighted key and inputs a character corresponding to the selected key. The control unit 260 controls the various units of the apparatus 200.

The input unit includes a remote controller 210. The remote controller 210 includes a predetermined number of number pads. A first key includes number keys. A second key includes direction keys to move in horizontal and vertical directions and diagonal direction and function keys for executing predetermined functions.

For reference, the input unit is not limited to the remote controller according to the present embodiment, but various modifications of the input unit can be made without departing from the scope of the present invention. In addition, the apparatus 200 shown in FIG. 2 is included in a computer (PC), but the present invention is not limited thereto. The apparatus 200 may be included in various electronic apparatuses having display units that can display information input by the remote controller, such as digital TVs and set-top boxes, in addition to the computer. For the sake of convenience, the OSK is herein assumed to be displayed on the screen of a computer.

The receiving unit 220 receives information on a first key that is selected by the remote controller 210, that is, numerical information on the OSK that is input by a user. For example, when the user selects the number "7" on the remote controller 210, the receiving unit 220 receives information on the number on the remote controller 210 selected by the user, and transmits information indicating that the user has selected the number "7" to the highlight-setting unit 230. The term "numerical information" may be considered an infrared signal transmitted from the remote controller 210.

The highlight-setting unit 230 highlights a predetermined key in a group of keys, including a number key on the OSK, corresponding to the information on the number selected by the user from the receiving unit 220. Alternatively, the highlight-setting unit 230 may highlight the group of keys, including a number key on the OSK, corresponding to the information on the number selected by the user from the receiving unit 220.

Figure 3:
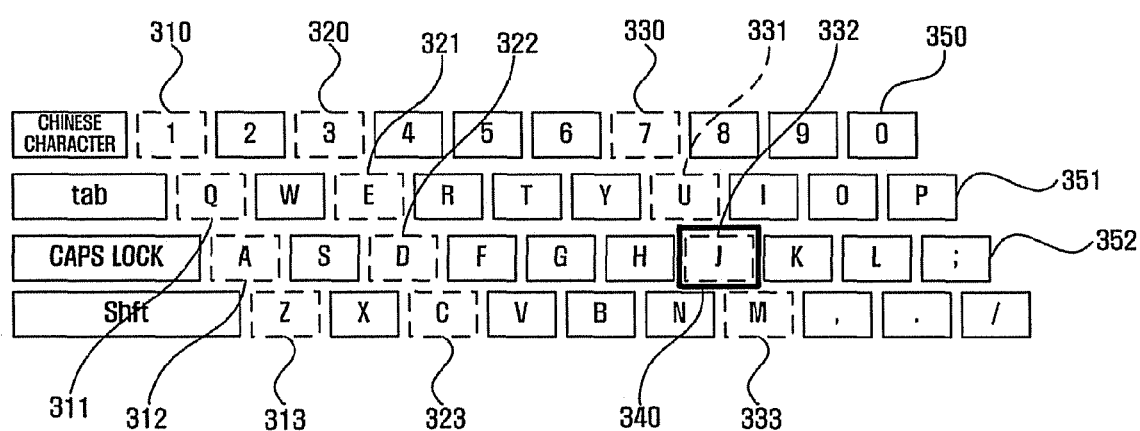
FIG. 3 is a diagram illustrating a predetermined group of keys on the OSK according to an embodiment of the present invention.

The highlight-setting unit 230 will be described below with reference to FIG. 3. FIG. 3 shows a predetermined group of keys on the OSK according to an embodiment of the present invention.

The predetermined group of keys on the OSK includes numbers, and can be set by the user. For example, numbers on the OSK and keys existing on a predetermined axis including the numbers on the OSK may form one group (hereinafter, referred to as a "group"). Alternatively, numbers on the OSK and keys adjacent to the numbers on the OSK in the vertical and horizontal directions may form a group.

In the present embodiment, numbers on the OSK and keys existing on a predetermined axis including the numbers form a group. For example, the number '1'(310) and the keys 'Q' (311), 'A' (312) and 'Z' (313) form a group, and the number '3' (320) and the keys 'E' (321), 'D' (322) and 'C' (323) also form a group. The number '7' (330) and the keys 'U' (331), 'J' (332) and 'M' (333) also form a group. Groups are formed from the other numbers and keys in a similar way. Alternatively, according to another embodiment, numbers on the OSK and keys adjacent to the numbers on the OSK may form groups. However, methods of forming groups are not limited to the above examples.

As described with reference to the receiving unit 210, when the user selects the number '7' (330) from the number buttons of the remote controller 210, the receiving unit 220 receives information on the number input through the remote controller 210 by the user, and transmits information on the number '7' (330) to the highlight-setting unit 230. The highlight-setting unit 230 highlights (as represented by the bold outline identified with the reference numeral 340) a predetermined key on the OSK that corresponds to the number '7' (330). The position 340 highlighted by the highlight-setting unit 230, that is, the key on the OSK that corresponds to the number '7' (330), may be any one of the keys 'U' (331), 'J' (332), and 'M' (333) that form a group, or the key corresponding to the number '7' (330) may be directly highlighted by the highlight-setting unit 230.

A predetermined key on the OSK corresponding to an input number may be positioned in the middle of the keys forming a group. For example, when the user inputs number '7' (330), the highlighted position 340 is the key 'J' (332), so that only one stroke of the vertical button is needed to directly move the key 'U' (331) or 'M' (333). In another example, the predetermined key on the OSK corresponding to an input number may be the key among the group of keys that is most commonly used. Thus, if the user inputs the number '3' (320), the highlighted position 340 may be the key 'E' (321), as 'E' is the most commonly used key among the keys '3' (320), 'E' (321), 'D' (322), and 'C' (323).

The highlight-setting unit 230 may alternatively highlight a predetermined key on the OSK, or the highlight-setting unit 230 may highlight a group of keys including the predetermined key on the OSK. For example, when the user selects the number '7' (330) from the number buttons of the remote controller 210, the highlight-setting unit 230 highlights the number '7' (330) and the keys 'U' (331), 'J' (332), and 'M' (333) that belong to a corresponding group.

The highlight-setting unit 230 can highlight a predetermined key, or the highlight-setting unit 230 can highlight both a predetermined group and a predetermined key. If both a predetermined group and a predetermined key are highlighted, the predetermined group and the predetermined key may be highlighted in different colors for discrimination. When a predetermined group is highlighted, the user can directly view a group of keys including a predetermined key corresponding to the number input by the user, and thus can use the OSK to intuitively input a desired character.

The present invention is not limited to the above, but various modifications and changes of the present invention can be made without departing from the scope of the present invention. For example, a key and a group of keys on the OSK that is highlighted (which is represented by reference numeral 340) by the highlight-setting unit 230 may be set by the user.

The highlight-moving unit 240 moves the highlighted portion on the OSK in response to the selection of the second keys of the remote controller 210, that is, direction keys for movement in the horizontal and vertical directions, and the diagonal direction and function keys for executing predetermined functions. As described herein, the second key of the remote controller 210 for moving the highlighted portion on the OSK includes 'right, left, up, and down keys' and a 'confirm button' for inputting a character corresponding to the highlighted key. However, any key, group of keys, or keystroke combination on the remote controller 210 can perform the above operations, depending on the layout of the remote controller 210.

In the related art, in order to select the key 'Q' (311) and then select the key 'P' (351), the user needs to push the right button of the remote controller 210 several times. In contrast, according to aspects of the present invention, when the user selects number '0' (350) with key Q (311) being selected from the remote controller 210, a predetermined key ';' (352) on the OSK corresponding to number '0' (350) is highlighted, so that the user can push the up button of the remote controller 210 once to select the key 'P' (351). As a result, it is possible to input a desired character more rapidly than in the related art.

Although not required in all aspects, when the same number button on the OSK is continuously selected, the highlighted portion may be moved upward from a predetermined key on the OSK. In this case, when the user selects number '0' (350) on the remote controller 210, a predetermined key ';' (352) on the OSK that corresponds to number '0' (350) is highlighted. When the number '0' (350) is selected again, the key 'P' (351) is highlighted since it is assumed that the highlighted portion is moved upward in a predetermined group. The user is thus able to move the highlighted portion by just selecting number '0' (350) twice, instead of pushing a button on the remote controller 210 several times. As a result, it is possible to input a desired character more rapidly than the related art.

A character corresponding to the key that is selected by moving the highlighted portion is input to the character-input unit 250. When the key on the OSK that corresponds to the number input by the user is not the character that the user wants to input, the user can move the highlighted portion 340 on the OSK using the right, left, up, and down buttons on the remote controller 210. When the highlighted portion 340 is set to a key having a desired character thereon, the user pushes a selection button on the remote controller 210 to input the corresponding character to the character-input unit 250. The character-input unit 250 inputs the corresponding character into a predetermined position or a field of an activated program in the form of text.

FIG. 4 is a flowchart of a process of using an OSK as an input unit according to an embodiment of the present invention. In the example described below with respect to FIG. 4, it is assumed that the OSK is displayed on the screen of the computer and the user inputs the word 'SAMSUNG'. In addition, the process shown in FIG. 4 will be described with reference to the apparatus 200 shown in FIG. 2.

The user inputs a group of numbers including a number that the user wants to input to the remote controller 210 in operation S401. In order to select an initial character 'S' of the word 'SAMSUNG' on the OSK, the user inputs the number '2' that exists on the same axis as the initial character 'S' on the OSK. Here, the number '2' and the keys 'W', 'S', and 'X' form a group.

The receiving unit 220 receives information on the number input by the user from the remote controller 210 in operation S402. Then, the receiving unit 220 transmits the information on the number '2' received from the remote controller 210 to the highlight-setting unit 230.

The highlight-setting unit 230 highlights a key on the OSK corresponding to the number '2' input by the user, that is, the key 'S', in operation S403. The key 'S' on the OSK is predetermined so as to correspond to the number '2' input by the user. The keys on the OSK that correspond to the number '2', that is, the keys 'W', 'S', and 'X' that form a group together with number '2' as well as the number '2', may be highlighted.

The user determines whether the highlighted character matches the character that the user wants to input in operation S404. If the character 'S' that the user wants to input is highlighted, the user pushes the confirm button on the remote controller 210 to input the character into the character-input unit 250 in operation S405. The character-input unit 250 inputs the corresponding character into a predetermined position or a field of an activated program in the form of text in operation S406.

If the highlighted character does not match the character that the user wants to input, the user repeats operations S401 to S403, or uses the right, left, up, and down buttons on the remote controller 210 to control the highlight-moving unit 240 to move the highlighted portion, thereby selecting a key corresponding to the character that the user wants to input.

In this way, the word 'SAMSUNG' can be input. A process method of inputting characters other than the initial character 'S' will be briefly described below. When the user selects the number '1' on the remote controller 210 to input the character 'A', the receiving unit 220 receives information on the number selected by the user from the remote controller 210, and transmits the information to the highlight-setting unit 230.

The highlight-setting unit 230 highlights the key 'A' on the OSK that corresponds to the number '1'. Since the highlighted character matches the character that the user wants to input, the user pushes a selection button on the remote controller 210, and the character-input unit 250 inputs the corresponding character into a predetermined position or a field of an activated program in the form of text.

After inputting the letter 'A', the user selects the number '7' on the remote controller 210 to input the character 'M'. The receiving unit 220 receives information on the number input by the user from the remote controller 210, and transmits the information to the highlight-setting unit 230.

The highlight-setting unit 230 highlights the key 'J' on the OSK that corresponds to the number '7'. Since the highlighted character does not match the character that the user wants to input, the user pushes the down button of the remote controller 210 once to control the highlight-moving unit 240 to move the highlighted portion to a key corresponding to the character 'M'. Since the letter 'M' matches the letter that the user wants to input, the user pushes the selection button on the remote controller 210, and the character-input unit 250 inputs the corresponding character into a predetermined position or a field of an activated program in the form of text.

The process of inputting the character 'S' has been described above, and so a further description thereof has been omitted. Assuming that the key 'S' is currently highlighted, a process of inputting the character 'U' will be briefly described below.

After inputting the letter 'S', the user selects the number '7' on the remote controller 210 to input the character 'U'. The receiving unit 220 receives information on the number input by the user from the remote controller 210, and transmits the information to the highlight-setting unit 230.

The highlight-setting unit 230 highlights the key 'J' on the OSK that corresponds to number '7'. Since the highlighted character does not match the character that the user wants to input, the user pushes the up button of the remote controller 210 once to control the highlight-moving unit 240 to move the highlighted portion to a key corresponding to the character 'U'. Since the letter 'U' matches the character that the user wants to input, the user pushes the selection button on the remote controller 210, and the character-input unit 250 inputs the corresponding character into a predetermined position or a field of an activated program in the form of text.

After inputting the character 'U', the user selects the number '6' on the remote controller 210 to input the character 'N'. The receiving unit 220 receives information on the number input by the user from the remote controller 210, and transmits the information to the highlight-setting unit 230.

The highlight-setting unit 230 highlights the 'H' key on the OSK that corresponds to the number '6'. Since the highlighted character does not match the character that the user wants to input, the user pushes the down button of the remote controller 210 once to control the highlight-moving unit 240 to move the highlighted portion to a key corresponding to the character 'N'. Since the character 'N' matches the character that the user wants to input, the user pushes the selection button on the remote controller 210, and the character-input unit 250 inputs the corresponding character into a predetermined position or a field of an activated program in the form of text.

Finally, after inputting the letter 'N', the user selects the number '5' on the remote controller 210 to input the letter 'G'. The receiving unit 220 receives information on the number input by the user via the remote controller 210, and transmits the information to the highlight-setting unit 230.

The highlight-setting unit 230 highlights the 'G' key on the OSK that corresponds to the number '5'. Since the highlighted character matches the character that the user wants to input, the user pushes the selection button on the remote controller 210, and the character-input unit 250 inputs the corresponding character into a predetermined position or a field of an activated program in the form of text. In this way, it is possible to input characters on the OSK using a remote controller more rapidly than the related art.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of using an on-screen keyboard having a plurality of predetermined groups of keys, the method comprising:
   receiving information on a first key of an input unit that is selected through the input unit, the input unit having fewer input keys than the on-screen keyboard;
   highlighting a predetermined key in a predetermined group of keys that includes the first key; and
   moving a highlighted portion on the on-screen keyboard when a second key is selected through the input unit,
   wherein each of the predetermined groups of keys includes a number key and a key that is not a number key.

2. The method of claim 1, further comprising:
   selecting the highlighted key and inputting a character corresponding to the selected key.

3. The method of claim 1, wherein the predetermined group includes the predetermined key existing on a predetermined axis on the on-screen keyboard.

4. The method of claim 1, wherein the predetermined group includes the predetermined key and keys adjacent thereto on the on-screen keyboard.

5. The method of claim 1, wherein the predetermined key is disposed at a position that enables the highlighted portion to move to another key in the predetermined group with a minimum number of keystrokes.

6. The method of claim 1, wherein, the moving of the highlighted portion comprises:
   moving the highlighted portion to an adjacent key when the second key is selected through the input unit.

7. The method of claim 1, further comprising:
   highlighting the predetermined group of keys including the number key on the on-screen keyboard that corresponds to the first key.

8. The method of claim 7, wherein the moving of the highlighted portion comprises:
   moving the highlighted portion in the unit of the predetermined group when the second key is selected through the input unit.

9. The method of claim 1, wherein:
   the input unit is a remote controller;
   the remote controller comprises a predetermined number of number pads; and
   the first key is a number key.

10. An apparatus using an on-screen keyboard, the apparatus comprising:
    a display unit to display the on-screen keyboard, the on-screen keyboard including a plurality of predetermined groups of keys, each of the predetermined groups of keys including a number key and a key that is not a number key;

an input unit having a smaller number of input keys than the number of keys of the on-screen keyboard;

a receiving unit to receive information on a first key of the input unit that is selected through the input unit;

a highlight-setting unit to highlight a predetermined key in a predetermined group of keys that includes the first key; and a moving unit to move a highlighted portion on the on-screen keyboard when a second key is selected through the input unit.

11. The apparatus of claim 10, further comprising:

a character-input unit to select the highlighted key and to input a character corresponding to the selected key.

12. The apparatus of claim 10, wherein the predetermined group includes the predetermined key and keys existing on a predetermined axis on the on-screen keyboard.

13. The apparatus of claim 10, wherein the predetermined group includes the predetermined key and keys adjacent thereto on the on-screen keyboard.

14. The apparatus of claim 10, wherein the predetermined key is disposed at a position that enables the highlighted portion to move to another key in the predetermined group with a minimum number of keystrokes.

15. The apparatus of claim 10, wherein the highlight-moving unit moves the highlighted portion to an adjacent key when the second key is selected through the input unit.

16. The apparatus of claim 10, wherein the highlight-setting unit highlights the predetermined group of keys including the number key on the on-screen keyboard that corresponds to the first key.

17. The apparatus of claim 16, wherein the highlight-moving unit moves the highlighted portion in the unit of the predetermined group when the second key is selected through the input unit.

18. The apparatus of claim 10, wherein:

the input unit comprises a remote controller;

the remote controller comprises a predetermined number of number pads; and the first key is a number key.

19. A method of using an on-screen keyboard (OSK) having a plurality of predetermined groups of keys, the method comprising:

highlighting a predetermined key within a predetermined group of keys corresponding to a first input signal received from an input unit having fewer keys than the OSK;

moving the highlight from the predetermined key to another key within the predetermined group of keys based on a second input signal received from the input unit; and selecting a highlighted key on the OSK based on a confirmation signal received from the input unit, wherein each of the predetermined groups of keys includes a number key and a key that is not a number key.

20. The method of claim 19, wherein the predetermined group comprises the predetermined key and keys located along an axis of the OSK having the predetermined key.

21. The method of claim 20, further comprising:

highlighting the predetermined group upon receiving the first input signal.

22. The method of claim 19, wherein the first input signal corresponds to a number key.

23. An apparatus having an on-screen keyboard (OSK) usable with a remote input unit having a fewer number of keys than the OSK, the apparatus comprising:

a display unit to display the OSK, the OSK including a plurality of predetermined groups of keys, each of the predetermined groups of keys including a number key and a key that is not a number key;

a receiving unit to receive a first input signal from the remote input unit;

a highlight-setting unit to highlight a predetermined key within a predetermined group of keys corresponding to the first input signal;

a highlight-moving unit to move the highlight from the predetermined key to another key in the predetermined group of keys based on a second input signal received from the remote input unit by the receiving unit; and a selection unit to select a highlighted key on the OSK based on a confirmation signal received from the remote input unit by the receiving unit.

24. The apparatus of claim 23, wherein the predetermined group comprises the predetermined key and keys located along an axis of the OSK having the predetermined key.

25. The apparatus of claim 23, wherein:

the remote input unit is a remote control having a plurality of number keys, a plurality of direction keys, and a confirmation key; and the first input signal is transmitted using the number keys, the second input signal is transmitted using the direction keys, and the confirmation signal is transmitted using the confirmation key.

* * * * *